(12) United States Patent
Uchida et al.

(10) Patent No.: US 10,381,723 B2
(45) Date of Patent: Aug. 13, 2019

(54) WIRELESS COMMUNICATION APPARATUS

(71) Applicant: Mitsubishi Electric Corporation, Chiyoda-ku (JP)

(72) Inventors: Shigeru Uchida, Tokyo (JP); Akihiro Okazaki, Tokyo (JP); Akinori Taira, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/564,095

(22) PCT Filed: Aug. 5, 2015

(86) PCT No.: PCT/JP2015/072289
§ 371 (c)(1),
(2) Date: Oct. 3, 2017

(87) PCT Pub. No.: WO2017/022112
PCT Pub. Date: Feb. 9, 2017

(65) Prior Publication Data
US 2018/0138590 A1    May 17, 2018

(51) Int. Cl.
*H01Q 3/01* (2006.01)
*H04J 11/00* (2006.01)
(Continued)

(52) U.S. Cl.
CPC ............. *H01Q 3/01* (2013.01); *H04B 7/0413* (2013.01); *H04B 7/0617* (2013.01);
(Continued)

(58) Field of Classification Search
CPC ....................................................... H04Q 3/01
See application file for complete search history.

(56) References Cited

U.S. PATENT DOCUMENTS

| 7,496,361 | B1* | 2/2009 | Mitchell | H04L 67/12 |
| | | | | 455/423 |
| 7,551,680 | B2 | 6/2009 | Goldberg | |
| 2007/0243831 | A1 | 10/2007 | Seki | |
| 2009/0179797 | A1* | 7/2009 | Kwon | H01Q 1/246 |
| | | | | 342/368 |

(Continued)

FOREIGN PATENT DOCUMENTS

| CN | 103828257 A | 5/2014 |
| EP | 1069713 A1 | 1/2001 |

(Continued)

OTHER PUBLICATIONS

International Search Report dated Sep. 29, 2015 in PCT/JP2015/072289 filed Aug. 5, 2015.

(Continued)

*Primary Examiner* — Jamaal Henson
(74) *Attorney, Agent, or Firm* — Oblon, McClelland, Maier & Neustadt, L.L.P.

(57) ABSTRACT

A wireless communication apparatus, for example a wireless base station that spatially multiplexes data for transmission, includes plural array antennas and a beam shape controller that controls the array antennas to form beams of different shapes and each transmit signals for communication quality measurement in an area to be covered by the apparatus, and determines an initial value of a beam shape to be used in data transmission to a counterpart device that has received the signal for communication quality measurement, and after the initial value is determined, repeatedly executes processing to control the array antennas to tentatively change a beam shape in use in data transmission to the counterpart device, and redetermine a beam shape to be used in data transmission to the counterpart device, based on communication quality measured when the post-tentative-change beam shape is used and communication quality measured when the pre-tentative-change beam shape is used.

3 Claims, 9 Drawing Sheets

(51) Int. Cl.
*H04W 16/28* (2009.01)
*H04B 7/0413* (2017.01)
*H04B 7/06* (2006.01)

(52) U.S. Cl.
CPC ......... *H04B 7/0619* (2013.01); *H04B 7/0695* (2013.01); *H04J 11/0069* (2013.01); *H04W 16/28* (2013.01)

(56) References Cited

U.S. PATENT DOCUMENTS

| | | | |
|---|---|---|---|
| 2009/0245411 A1 | 10/2009 | Goldberg | |
| 2011/0009105 A1* | 1/2011 | Lee | H01Q 9/0407 455/418 |
| 2013/0065622 A1 | 3/2013 | Hwang | |
| 2013/0072243 A1 | 3/2013 | Yu et al. | |
| 2013/0083774 A1 | 4/2013 | Son et al. | |
| 2013/0142270 A1 | 6/2013 | Stirling-Gallacher | |
| 2013/0286960 A1* | 10/2013 | Li | H04W 72/042 370/329 |

FOREIGN PATENT DOCUMENTS

| | | |
|---|---|---|
| JP | 2007-300606 A | 11/2007 |
| JP | 2008-518554 A | 5/2008 |
| JP | 4536733 B2 | 9/2010 |
| JP | 2014-179776 A | 9/2014 |
| WO | WO 02/39543 A1 | 5/2002 |
| WO | 2013/039331 A2 | 3/2013 |
| WO | 2013/039352 A2 | 3/2013 |

OTHER PUBLICATIONS

Extended European Search Report dated Jun. 14, 2018 in European Patent Application No. 15900423.3, 8 pages.

Office Action dated Dec. 12, 2018 in European Patent Application No. 15 900 423.3, 5 pages.

Office Action dated Sep. 3, 2018 in Chinese Patent Application No. 201580080831.7, with English-language translation, 13 pages.

Office Action dated Apr. 4, 2019 in European Patent Application No. 15900423.3.

* cited by examiner

| BEAM SHAPE | RECEIVED POWER (dBm) |
|---|---|
| #1 | -72 |
| #2 | -63 |
| #3 | -55 |
| #4 | -68 |
| #5 | -78 |
| #6 | -84 |
| #7 | -75 |
| #8 | -81 |

WIRELESS COMMUNICATION APPARATUS

FIELD

The present invention relates to a wireless communication apparatus that spatially multiplexes data for transmission.

BACKGROUND

In order to transmit large-volume data by the use of limited frequencies, multiple-input and multiple-output (MIMO) systems for performing spatial multiplex transmission using a plurality of transmitting and receiving antennas are being developed. The number of spatial multiplexing is expected to continue to increase for further improvements in frequency utilization efficiency.

In the next-generation of mobile communication systems, the use of high frequencies exceeding 6 GHz is being studied. However, the use of a high-frequency band disadvantageously increases propagation loss. On the other hand, for the use of a high-frequency band, antenna elements can be increased to form a transmission beam with high gain. Thus, it is being studied to compensate, by forming a transmission beam, for the disadvantage of propagation loss increase. A technology of combining MIMO transmission and an array antenna formed of a multi-element antenna is being developed to avoid a reduction in the cover area of a cell while achieving large-volume data transmission.

Patent Literature 1 describes an invention that combines MIMO transmission and a plurality of array antennas, and controls the antennas to form transmission beams that reduce correlation between MIMO streams and increase reception quality. The invention described in Patent Literature 1 sweeps transmission beams at small angular intervals when determining transmission beam shapes, thereby searching for a plurality of beams of low correlation and good reception quality.

Patent Literature 2 describes an invention that selects a combination of beam antennas so as to maximize the signal-to-interference-and-noise ratio (SINR) of each MIMO stream, and further minimize the correlation coefficient of a channel transfer matrix.

CITATION LIST

Patent Literature

Patent Literature 1: Japanese Patent 4536733
Patent Literature 2: Japanese Patent Application Laid-Open No. 2007-300606

SUMMARY

Technical Problem

In the inventions described in Patent Literatures 1 and 2, a system including MIMO processing and a plurality of array antennas (beam antennas) on the wireless base station side selects, for each array antenna, a beam shape that reduces correlation between MIMO streams and increases reception quality. Here, channel information on all beam shapes are necessary to select beam shapes, and it is necessary to perform a transmission beam sweep to cover all beam shapes. In this case, radio resources for a beam sweep the number of which corresponds to the multiplication of the number of array antennas by the number of beam shapes, are consumed. To apply the above-described system that combines MIMO processing and a plurality of array antennas to a next-generation mobile communication system, a large number of array antennas are necessary for multiplexing a large number of MIMO streams. This results in enormous radio resource consumption for a beam sweep.

The present invention has been made in view of the above, and has an object of providing a wireless communication apparatus capable of reducing the amount of consumption of radio resources when determining beam shapes.

Solution to Problem

In order to solve the above-described problem and attain the object, an aspect of the present invention provides a wireless communication apparatus that spatially multiplexes data for transmission and includes a plurality of array antennas. The wireless communication apparatus controls the plurality of array antennas so that the array antennas form beams of different shapes and each transmit signals for communication quality measurement in an area to be covered by the apparatus, and determines an initial value of a beam shape to be used in data transmission to a counterpart device that has received the signal for communication quality measurement, based on communication quality of each beam measured by the counterpart device. The wireless communication apparatus repeatedly executes processing to control the array antennas to tentatively change a shape of a beam in use in data transmission to the counterpart device, and redetermine a beam shape to be used in data transmission to the counterpart device, based on communication quality measured when the post-tentative-change beam is used and communication quality measured when the pre-tentative-change beam is used.

Advantageous Effects of Invention

The wireless communication apparatus according to the present invention achieves an effect of being able to reduce the amount of consumption of radio resources when determining beam shapes.

DESCRIPTION OF EMBODIMENTS

Hereinafter, a wireless communication apparatus according to embodiments of the present invention will be described in detail with reference to the drawings. The embodiments are not intended to limit the invention.

First Embodiment

Figure 1:
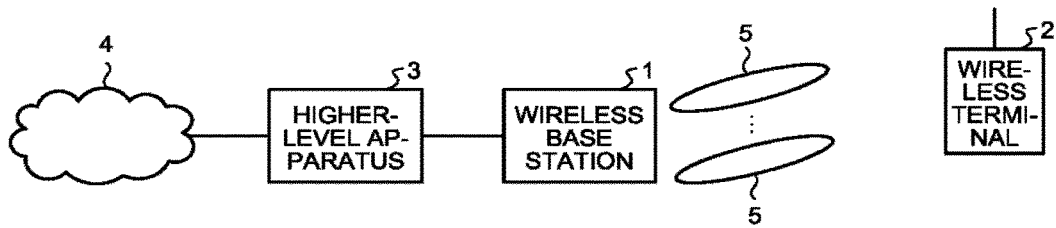
FIG. 1 is a diagram illustrating a configuration example of a communication system to which a wireless communication apparatus according to a first embodiment is applied.

FIG. 1 is a diagram illustrating a configuration example of a communication system to which a wireless communication apparatus according to a first embodiment is applied. The communication system illustrated in FIG. 1 includes a wireless base station 1, a wireless terminal 2, and a higher-level apparatus 3. The wireless base station 1 is the wireless communication apparatus according to the first embodiment.

The wireless base station 1 is configured to be capable of forming a plurality of beams 5 using array antennas, and communicates with the wireless terminal 2, a counterpart device, using one or more beams 5. FIG. 1 illustrates one wireless terminal 2; however, this is an example. A plurality of wireless terminals 2 can simultaneously communicate with the wireless base station 1. The wireless terminal 2 can be configured to have a plurality of antennas. The higher-level apparatus 3 is an apparatus on the core network side. A gateway, a mobility management entity (MME), or the like corresponds to the higher-level apparatus 3. The wireless base station 1 is connected to the higher-level apparatus 3 via a communication line, and the higher-level apparatus 3 is connected to a network 4. The network 4 is a network different from the wireless communication network that includes the wireless base station 1, the wireless terminal 2, and the higher-level apparatus 3.

Figure 2:
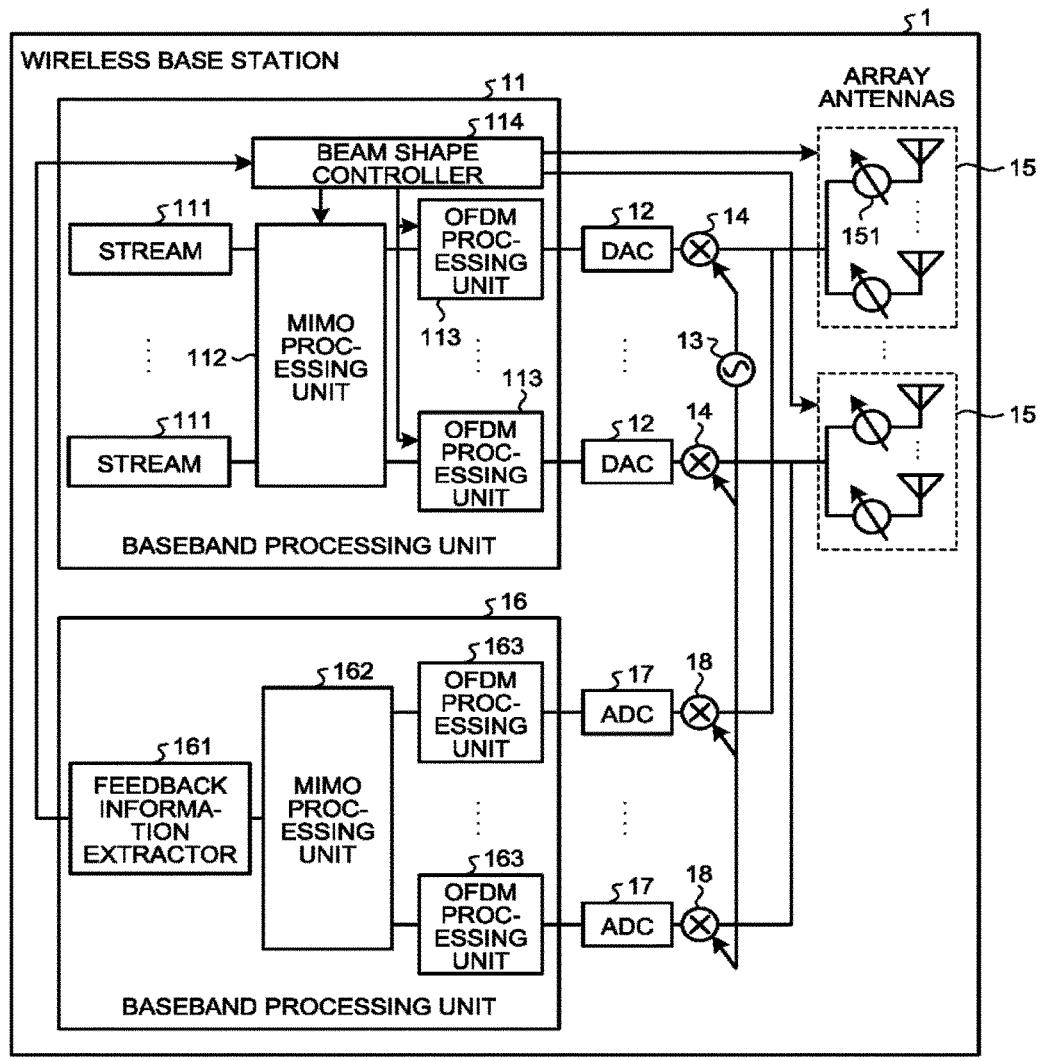
FIG. 2 is a diagram illustrating a configuration example of a wireless base station in the first embodiment.

FIG. 2 is a diagram illustrating a configuration example of the wireless base station 1 in the first embodiment. FIG. 2 describes only the main components of the wireless base station 1, and omits the description of components for processes that are not directly related to the implementation of the invention, e.g. components for communicating with the higher-level apparatus 3. FIG. 2 illustrates an example in a case where the present invention is applied to the wireless base station 1, which is a wireless communication apparatus that performs orthogonal frequency-division multiplexing (OFDM) processing. However, the present invention is not limited to a wireless communication apparatus that performs multicarrier transmission. The present embodiment illustrates an example of a wireless base station; however, the present invention is not limited to a wireless base station. For example, the wireless terminal 2 may have the same function.

With reference to FIG. 2, the configuration and operation of the wireless base station 1 will be described.

The wireless base station 1 includes baseband processing units 11 and 16, a plurality of digital-to-analog converters (DACs) 12, a local oscillator 13, a plurality of mixers 14 and 18, a plurality of array antennas (hereinafter, referred to as antennas) 15, and a plurality of analog-to-digital converters (ADCs) 17. The wireless base station 1 provides a function of spatially multiplexing and simultaneously transmitting, to a plurality of users, signals addressed to the users (including multi-user MIMO and single-user MIMO).

The baseband processing unit 11 includes a MIMO processing unit 112, a plurality of OFDM processing units 113, and a beam shape controller 114. The baseband processing unit 11 generates transmission signals to be transmitted to wireless terminals 2, and controls the antennas 15.

When the MIMO processing unit 112 of the baseband processing unit 11 is fed streams 111, which constitute a signal stream group to be transmitted to the wireless terminals 2 by spatial multiplexing, the MIMO processing unit 112 distributes the fed streams 111 to the antennas 15, and performs MIMO processing including precoding and others on the distributed streams. The streams 111 are data strings that are transmitted to different wireless terminals. Precoding is processing for weighting by multiplying streams distributed to the antennas 15 by transmission weights. The transmission weights are calculated by the MIMO processing unit 112, based on the channel states between the wireless base station 1 and the wireless terminals 2. A way of determining channel states and calculating transmission weights is known as described in Patent Literature 1 described above and others, and thus will not be described in detail. The OFDM processing units 113 perform modulation processing, inverse fast Fourier transform (IFFT) processing, cyclic prefix (CP) addition processing, and others on signals fed from the MIMO processing unit 112, to generate transmission signals to be transmitted to the wireless terminals 2. In the modulation processing, input signals are modulated in accordance with a modulation scheme such as quadrature phase-shift keying (QPSK) or quadrature amplitude modulation (QAM). The beam shape controller 114 controls the antennas 15 based on communication quality information and others fed back from the wireless terminals 2 to be the destinations of the streams 111, to cause the antennas 15 to form transmission beams. Details of an operation of the beam shape controller 114 to control the antennas 15 will be described separately.

The DACs 12 convert transmission signals generated by the baseband processing unit 11 from digital signals to analog signals. The mixers 14 up-convert analog signals output from the DACs 12 to a carrier frequency, based on a locally generated signal output from the local oscillator 13, and feed them to the antennas 15.

The antennas 15 each include a plurality of phase shifters 151, and control the phase shifters 151 based on an instruction of the beam shape controller 114 of the baseband processing unit 11, that is, a control signal indicating the phase shift amounts of the phase shifters 151, thereby forming a beam in a direction specified by the beam shape controller 114. For example, each of the antennas 15 can direct a transmission beam in a direction in which a wireless terminal 2 easily receives signals, according to an instruction from the beam shape controller 114. Note that, to specify the phase shift amounts of the phase shifters 151 to the antennas 15, the beam shape controller 114 may specify phase shift amounts themselves, or may specify them in a different way. In the different way, for example, the antennas 15 store a plurality of predetermined phase shift amounts and identification numbers of the phase shift amounts in memory, the beam shape controller 114 notifies the antennas 15 of the identification numbers of phase shift amounts, and the antennas 15 read the phase shift amounts of the indicated identification numbers from the memory.

The antennas 15 receive signals transmitted from the wireless terminals 2. The antennas 15 can form reception beams when receiving signals from the wireless terminals 2.

Signals received by the antennas 15 are fed to the mixers 18. The mixers 18 down-convert analog received signals of a carrier frequency fed from the antennas 15 into signals of a baseband frequency, based on a locally generated signal output from the local oscillator 13. The ADCs 17 convert analog signal reception of the baseband frequency output from the mixers 18 into digital signals. The received signals converted into the digital signals by the ADCs 17 are fed to the baseband processing unit 16.

The baseband processing unit 16 includes a feedback information extractor 161, a MIMO processing unit 162, and a plurality of OFDM processing units 163. The baseband processing unit 16 processes signals received from the wireless terminals 2 via the antennas 15, the mixers 18, and the ADCs 17, and restores data transmitted from the wireless terminals 2. When the restored data contains information to be used in beam shape control, e.g. communication quality information and others, the baseband processing unit 16 outputs the information to the beam shape controller 114 of the baseband processing unit 11.

Figure 3:
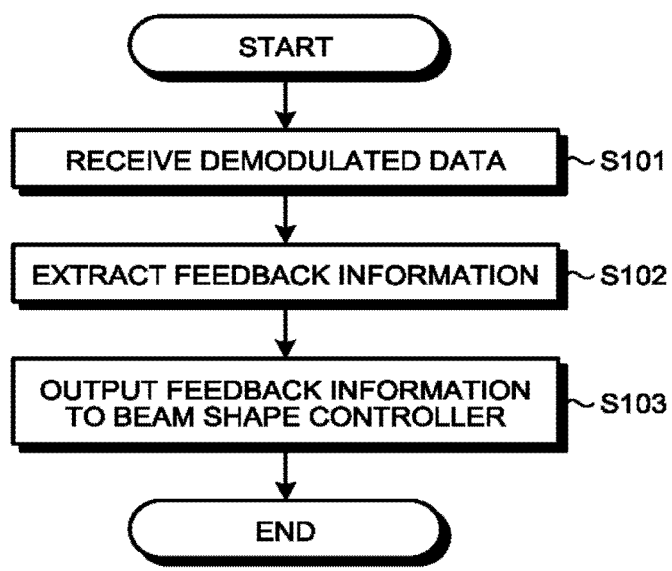
FIG. 3 is a flowchart illustrating an operation example of a feedback information extractor in the first embodiment.

The OFDM processing units 163 of the baseband processing unit 16 perform CP removal processing, FFT processing, demodulation processing, and others on signals fed from the ADCs 17 for demodulation. The MIMO processing unit 162 weights and combines demodulated received signals fed from the OFDM processing units 163. In weighting and combining performed by the MIMO processing unit 162, for example, channel estimation is performed based on a known sequence contained in received signals from the wireless terminals 2, and from resultant channel estimation values, weights of the received signals fed from the OFDM processing units 163 are calculated, and the received signals are multiplied by the calculated weights for weighting, and then combined. The feedback information extractor 161 extracts communication quality information from demodulated data, which are demodulated signals that have been weighted and combined by the MIMO processing unit 162, and outputs the communication quality information to the beam shape controller 114 of the baseband processing unit 11. FIG. 3 is a flowchart illustrating an operation example of the feedback information extractor 161. When receiving demodulated data from the MIMO processing unit 162 (step S101), the feedback information extractor 161 extracts feedback information (step S102). Then, the feedback information extractor 161 outputs the extracted feedback information to the beam shape controller 114 (step S103).

Figure 4:
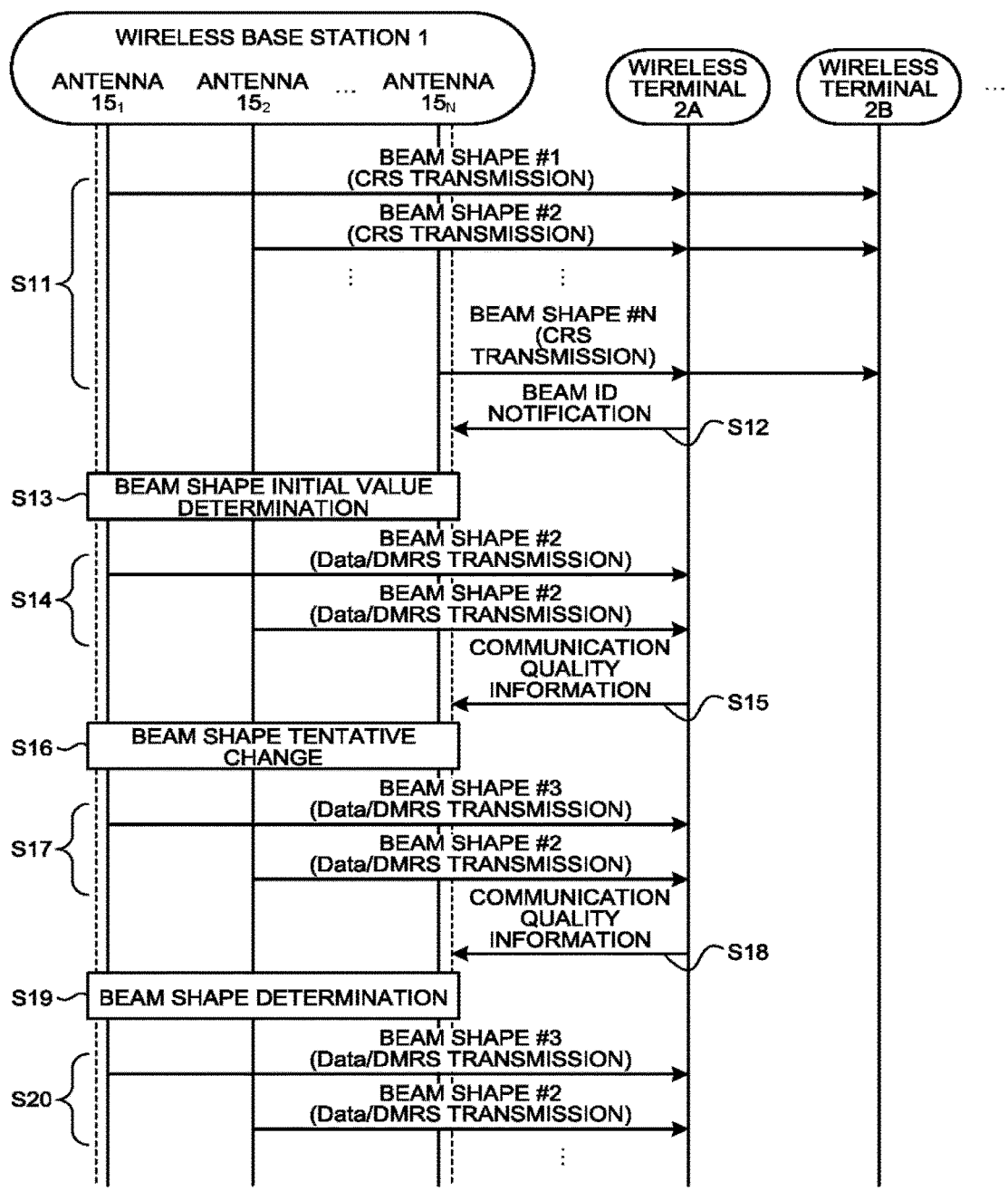
FIG. 4 is a sequence diagram illustrating an example of a beam shape control operation by the wireless base station in the first embodiment.

Next, a beam shape control operation by the wireless base station 1 will be described with reference to FIG. 4. FIG. 4 is a sequence diagram illustrating an example of the beam shape control operation by the wireless base station 1 in the first embodiment. FIG. 4 describes the plurality of antennas 15 included in the wireless base station 1 as antennas $15_1$ to $15_N$. In the following description, the antennas 15 are sometimes described as antennas $15_1$ to $15_N$. The example of FIG. 4 illustrates a case where the communication system complies with the Long Term Evolution (LTE) standard of the Third Generation Partnership Project (3GPP). This is an example and is not intended to limit the communication system to LTE.

In the beam shape control operation by the wireless base station 1, first, the wireless base station 1 transmits a signal containing a common reference signal (CRS) standardized by LTE from all the antennas 15, i.e. the antennas 151 to 15N to all the wireless terminals 2 (wireless terminals 2A, 2B, . . . ) (step S11). In this step S11, the antennas 15 of the wireless base station 1 form beams of different shapes. Specifically, in the wireless base station 1, the beam shape controller 114 specifies different phase shift amounts to the phase shifters 151 of the antennas 15. Different beam shapes mean different beam directions, that is, directions in which beams are formed are different to each other. Even though two beams have the same width, when the two beams are formed in different directions, both become beams of different shapes. The beam shape controller 114 specifies phase shift amounts to the antennas 15 such that beams are formed all over an area that should be covered by the wireless base station 1, that is, beams are formed in all directions within the area that should be covered by the wireless base station 1. Here, when it is difficult for the wireless base station 1 to form beams all over the area that should be covered even by forming beams in different directions using all the antennas 15, that is, when the number of beams necessary to form beams all over the area that should be covered is larger than the number of the antennas 15, the beam shape controller 114 controls one or more antennas 15 such that they form beams of a plurality of shapes over a plurality of radio frames. That is, the beam shape controller 114 controls one or more antennas 15 such that the shape of a beam is changed for a radio frame basis, to form beams all over the area that should be covered by the wireless base station 1. On the contrary, when the number of beams necessary to form beams all over the area that should be covered by the wireless base station 1 is smaller than the number of the antennas 15, the beam shape controller 114 may control some of the antennas 15 such that they do not form beams, or may control a plurality of antennas 15 such that they generate beams of the same shape.

In the present embodiment, in order to avoid complicated description, the widths of beams formed by the antennas 15 are fixed, and only the directions of the beams are changed to change the shapes of the beams.

A CRS is a signal used by the wireless terminals 2 to measure communication quality, that is, a signal for communication quality measurement. Communication quality here is, for example, a received power value, an SINR, a correlation value between a received CRS and a CRS held by the wireless terminals 2. In step S11, the wireless base station 1 transmits from each of the antennas 15 the CRS and a beam ID indicating the shape of a beam formed by the antenna. The CRS and the beam ID to be transmitted from each of the antennas 15 are, for example, output from the beam shape controller 114 to the OFDM processing unit 113 that corresponds to each of the antennas 15. The CRS and the beam ID fed to each of the OFDM processing units 113 are subjected to modulation processing and others, and then transmitted from the corresponding antenna 15 through the DAC 12 and the mixer 14 in later stages.

When the wireless terminals 2 receive the CRS transmitted from the antennas 15 in step S11, each wireless terminal 2 measures the communication quality of each beam, and notifies the wireless base station 1 of the beam ID of a beam of high communication quality, e.g. a beam of the received CRS with a high received power value, and the number of a radio frame in which the beam of the high received power value has been received (step S12). In step S12, the number of a radio frame is indicated together with a beam ID on the assumption that one or more antennas 15 of the wireless base station 1 form beams of a plurality of shapes over a plurality of radio frames in step S11 described above. The wireless terminals 2 may notify the beam IDs of a plurality of beams of high communication quality, for example, of a beam having the highest communication quality to a beam having the Mth highest communication quality and a radio frame number. Although, for explanatory convenience, FIG. 4 describes that only the wireless terminal 2A notifies the wireless base station 1 of a beam ID, wireless terminals 2 other than the wireless terminal 2A also notify the wireless base station 1 of a beam ID. The wireless terminals 2 may identify the beam ID of a transmitted beam by the use of a pseudorandom sequence value obtained when demodulating the CRS, for example. In LTE, when a CRS is transmitted, the CRS is converted into a pseudorandom sequence using information unique to a beam, e.g. a beam ID. Accordingly, a pseudorandom sequence is a pattern unique to each beam, and the CRS-receiving end can determine a received beam from a pseudorandom sequence. By providing each of the wireless terminals 2 with a table of correspondence between pseudorandom sequences and beam IDs in advance, each wireless terminal 2 can determine a beam ID from a pseudorandom sequence.

Figure 5:
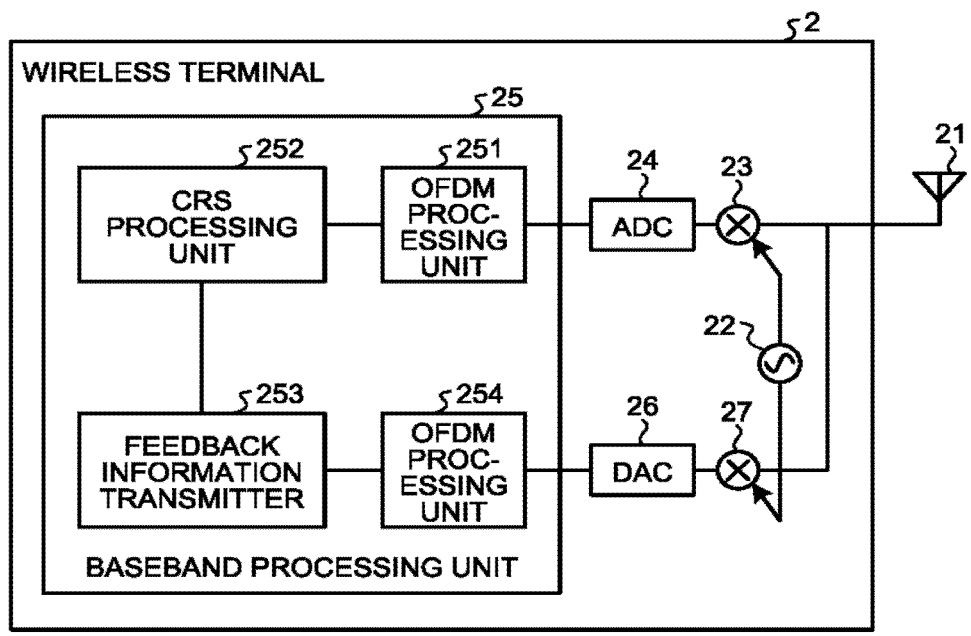
FIG. 5 is a diagram illustrating a configuration example of a wireless terminal in the first embodiment.

Here, the configuration of a wireless terminal 2 will be described. FIG. 5 is a diagram illustrating a configuration example of a wireless terminal 2 in the first embodiment. FIG. 5 only describes the main components of the wireless terminal 2, and omits the description of components for processing that is not directly related to the implementation of the invention.

The wireless terminal 2 includes an antenna 21, a local oscillator 22, mixers 23, 27, an analog-to-digital converter (ADC) 24, a baseband processing unit 25, and a digital-to-analog converter (DAC) 26.

At the wireless terminal 2, the antenna 21 receives radio signals transmitted from the wireless base station 1, and transmits signals fed from the mixer 27 to the wireless base station 1. The mixer 23 down-converts an analog received signal of a carrier frequency fed from the antenna 21 into a signal of a baseband frequency, based on a locally generated signal output from the local oscillator 22. The ADC 24 converts the analog signal reception of the baseband frequency output from the mixer 23 into a digital signal. The received signal converted into the digital signal by the ADC 24 is fed to the baseband processing unit 25.

The baseband processing unit 25 includes OFDM processing units 251, 254, a CRS processing unit 252, and a feedback information transmitter 253. The baseband processing unit 25 processes signals received from the wireless base station 1 via the antenna 21, the mixer 23, and the ADC 24, to restore data transmitted from the wireless base station 1. When the restored data contains a CRS and a beam ID, the baseband processing unit 25 measures communication quality using the CRS, and notifies the wireless base station 1 of the result of the communication quality measurement, the beam ID of a beam in which the CRS used in the measurement has been received, and the number of a radio frame in which the CRS and the beam ID have been received, as needed.

The OFDM processing unit 251 of the baseband processing unit 25 performs CP removal processing, FFT processing, demodulation processing, and others on received signals fed from the ADC 24. Using a CRS contained in a received signal, the OFDM processing unit 251 measures the communication quality of a beam in which the CRS has been transmitted (transmitted beam).

Figure 6:
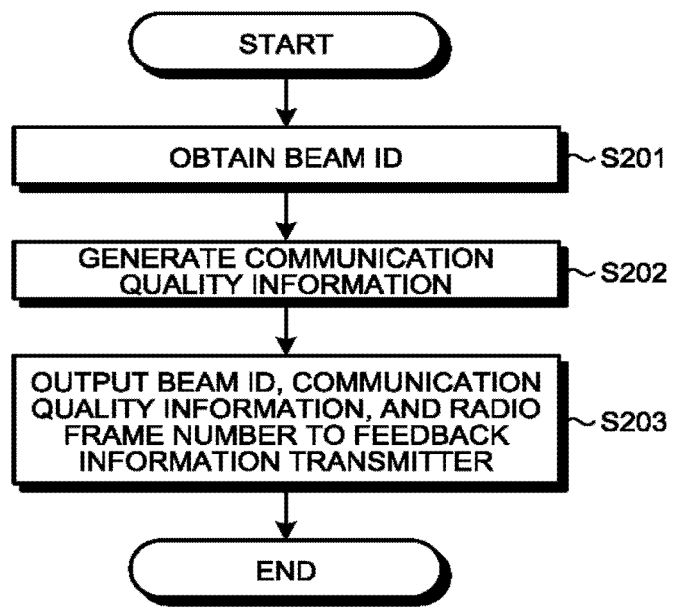
FIG. 6 is a flowchart illustrating an operation example of a CRS processing unit in the first embodiment.

FIG. 6 is a flowchart illustrating an operation example of the CRS processing unit 252. The CRS processing unit 252 obtains a beam ID from a demodulated signal output from the OFDM processing unit 251 (step S201), then generates communication quality information based on communication quality measured by the OFDM processing unit 251 (step S202). Next, the CRS processing unit 252 outputs, to the feedback information transmitter 253, the beam ID obtained in step S201, the communication quality information generated in step S202, and a radio frame number (step S203). The radio frame number output together with the beam ID in step S203 is the number of a radio frame in which the beam ID has been received.

The feedback information transmitter 253 transmits, some out of the beam ID, the communication quality information, and the radio frame number that are fed from the CRS processing unit 252, from the antenna 21 to the wireless base station 1 through the OFDM processing unit 254, the DAC 26, and the mixer 27. That is, the beam ID and the radio frame number are transmitted, or the beam ID, the communication quality information, and the radio frame number are transmitted. When the feedback information transmitter 253 executes step S12 illustrated in FIG. 4, for example, the feedback information transmitter 253 transmits, to the wireless base station 1, the beam ID of a transmission beam having the highest communication quality among beam IDs fed from the CRS processing unit 252, together with the number of a radio frame in which the beam ID has been received. Alternatively, in step S12, the feedback information transmitter 253 may transmit, to the wireless base station 1, the beam IDs of M number of transmission beams in descending order starting from the transmission beam having the highest communication quality to a transmission beam having the Mth highest communication quality, together with communication quality information and a radio frame number.

Figure 7:
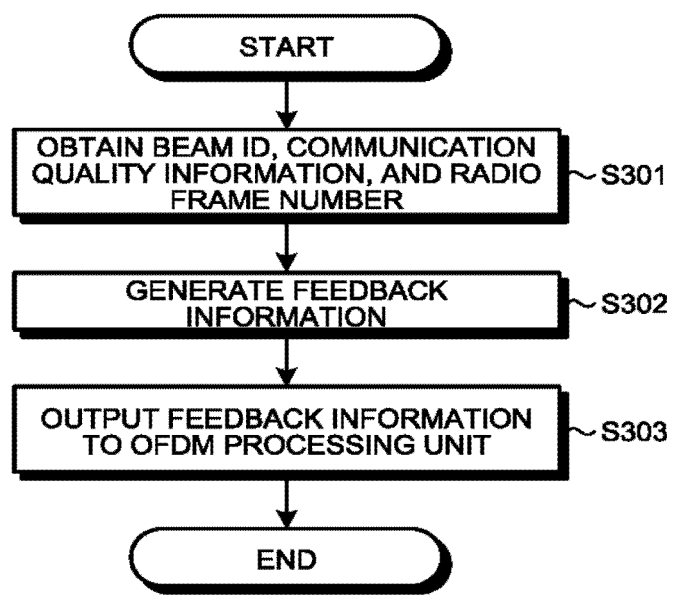
FIG. 7 is a flowchart illustrating an operation example of a feedback information transmitter in the first embodiment.

FIG. 7 is a flowchart illustrating an operation example of the feedback information transmitter 253. When the feedback information transmitter 253 acquires a beam ID, communication quality information, and a radio frame number from the CRS processing unit 252 (step S301), the feedback information transmitter 253 generates feedback information containing some out of the acquired beam ID, communication quality information, and radio frame number. That is, the beam ID and the radio frame number are contained, or the beam ID, the communication quality information, and the radio frame number are contained (step S302). Next, the feedback information transmitter 253 outputs the generated feedback information to the OFDM processing unit 254 (step S303). The feedback information output from the feedback information transmitter 253 is transmitted from the antenna 21 to the wireless base station 1 through the OFDM processing unit 254, the DAC 26, and the mixer 27. When the feedback information transmitter 253 executes step S12 illustrated in FIG. 4, for example, the feedback information transmitter 253 transmits, to the wireless base station 1, the beam ID of a transmission beam having the highest communication quality among beam IDs fed from the CRS processing unit 252, together with the number of a radio frame in which the beam ID has been received. That is, in step S302, the feedback information transmitter 253 generates feedback information containing the beam ID of a transmission beam having the highest communication quality and the number of a radio frame in which the beam ID has been received.

Alternatively, in step S12, the feedback information transmitter 253 may transmit, to the wireless base station 1, the beam IDs of M number of transmission beams in descending order starting from a transmission beam having the highest communication quality to a transmitted beam having the Mth highest communication quality, together with communication quality information and a radio frame number.

The OFDM processing unit 254 executes modulation processing, IFFT processing, CP addition processing, and others on a signal fed from the feedback information transmitter 253 to generate a transmission signal to be transmitted to the wireless base station 1.

The DAC 26 converts the transmission signal generated by the OFDM processing unit 254 of the baseband processing unit 25 from a digital signal to an analog signal. The mixer 27 up-converts the analog signal output from the DAC 26 to a carrier frequency, based on a locally generated signal output from the local oscillator 22, and feeds the converted signal to the antenna 21.

The description returns to operations illustrated in FIG. 4. Only the operations of the wireless base station 1 and the wireless terminal 2A will be described hereinafter. Assume that the wireless base station 1 performs the same processing for the wireless terminals 2 other than the wireless terminal 2A. Assume that the wireless terminals 2 other than the wireless terminal 2A perform the same processing as that of the wireless terminal 2A.

When the wireless base station 1 receives a notification of a beam ID from the wireless terminal 2A, the wireless base station 1 determines an initial value of beam shape of beams to be used for data transmission to the wireless terminal 2A, that is, an initial beam shape (step S13). At the wireless base station 1, the beam shape controller 114 determines a beam shape initial value. When only one set of a beam ID and a radio frame number is indicated in step S12 described above, the beam shape controller 114 sets the beam shape of a beam corresponding to the indicated beam ID and radio frame number for the initial value. When a plurality of sets of a beam ID, a radio frame number, and communication quality information is indicated in step S12 described above, the beam shape controller 114 selects a beam shape having the highest communication quality and sets the beam shape for an initial value, or selects a specified number of beam shapes in descending order in communication quality and sets the beam shapes for initial values.

In the present embodiment, the wireless base station 1 uses a plurality of antennas, the antennas form beams of different shapes to transmit a CRS all over an area that should be covered, and an initial value of a beam shape to be directed to a wireless terminal 2 is determined based on communication quality of the beams. However, a way of determining an initial value is not limited to this. The wireless base station 1 may search for a direction from which radio waves have arrived from a wireless terminal 2, and determine a beam shape initial value based on a search result. Alternatively, the wireless base station 1 may cause a wireless terminal 2 to notify the location of the wireless terminal 2, and determine a beam shape initial value based on the indicated location.

Next, using a beam shape indicated by the initial value determined in step S13, the wireless base station 1 transmits, to the wireless terminal 2A, data (Data) and a demodulation reference signal (DMRS) prescribed by LTE (step S14). The example illustrated in FIG. 4 shows an example in which two antennas 15 (antennas $15_1$, $15_2$) are used for the wireless terminal 2A to transmit data and a DMRS. In step S14 immediately after step S13 in which an initial value is determined, all antennas used, that is, both of the antennas $15_1$ and $15_2$ form beams of the same shape (beam shape #2 in FIG. 4). The DMRS is a signal necessary for the wireless terminals 2 to demodulate data. The DMRS is a signal for communication quality measurement that is necessary for measuring communication quality. When two beam shapes (assume that they are beam shapes #1 and #2) are set as beam shape initial values in step S13 described above, the wireless base station 1 may set the shape of a beam formed by the antenna $15_1$ to beam shape #1, and set the shape of a beam formed by the antenna $15_2$ to beam shape #2, for example, so that the antennas $15_1$ and $15_2$ form beams of different shapes.

When the wireless terminal 2A receives the data and the DMRS, the wireless terminal 2A demodulates the data using the DMRS and measures communication quality, to generate communication quality information indicating a measurement result. In the wireless terminal 2A, the OFDM processing unit 251 performs demodulation of data and measurement of communication quality. Communication quality is measured for each beam. The OFDM processing unit 251 measures received power, an SINR, or the like as the communication quality. The communication quality information is, for example, a received power value, a modulation coding scheme (MCS) value, a rank indicator (RI) value, or the like. The MCS value and the RI value are prescribed by LTE, and are information varying in value depending on communication quality. Thus, LTE allows these to be used as communication quality information. The generation of communication quality information may be performed by the OFDM processing unit 251 or may be performed by the CRS processing unit 252.

The wireless terminal 2A feeds back to the wireless base station 1 communication quality information indicating the communication quality of the signals transmitted in step S14 described above, that is, communication quality information on the signal received from the antenna $15_1$ and communication quality information on the signal received from the antenna $15_2$ (step S15). At the wireless terminal 2A, the feedback information transmitter 253 transmits communication quality information on signals received from antennas to the wireless base station 1. At this time, the feedback information transmitter 253 also transmits the beam IDs of the beams in which the data has been received or the antenna IDs. When the wireless base station 1 receives the communication quality information from the wireless terminal 2A in step S15, the wireless base station 1 uses beams of the same shape as the beams used in data transmission in step S14. Although FIG. 4 illustrates the sequence example in which the wireless terminals 2 measure communication quality and feed it back to the wireless base station 1, the wireless base station 1 may instruct the wireless terminals 2 to transmit a sounding reference signal (SRS) prescribed by LTE, and use the SRS transmitted from the wireless terminals 2 to measure communication quality. The SRS is a signal used for the wireless base station 1 to measure communication quality in the uplink, i.e. channels from the wireless terminals 2 to the wireless base station 1.

Then, the wireless base station 1 tentatively changes the shape of one or both of the beam formed by the antenna $15_1$ and the beam formed by the antenna $15_2$ used in communication with the wireless terminal 2A (step S16). That is, the beam shape controller 114 of the wireless base station 1 controls one or both of the antennas $15_1$ and $15_2$ used in communication with the wireless terminal 2A to tentatively change the beam shape. The beam shape controller 114 controls, for example, the antenna $15_1$ to tentatively change the shape of the beam formed by the antenna $15_1$. The beam shape controller 114 controls the antenna $15_1$ so that the antenna $15_1$ forms a beam of a shape similar to the shape of the beam used up to that time. The beam shape controller 114, for example, controls the antenna $15_1$ so that the antenna $15_1$ forms a beam at an angle in a boresight direction close to that of the beam used up to that time, that is, the antenna $15_1$ forms a beam in a direction close to a direction in which the beam used up to that time has been formed. Here, description will be continued on the assumption that the beam shape of the antenna $15_1$ has been tentatively changed to beam shape #3.

Next, using the post-tentative-change beams, the wireless base station 1 transmits data and a DMRS from the antennas 15 (antennas $15_1$ and $15_2$) (step S17). The operation in step S17 is identical to the operation in step S14 described above except that the shape of a beam used is different. When the wireless terminal 2A receives the data and the DMRS, the wireless terminal 2A measures communication quality and feeds back communication quality information to the wireless base station 1 as in step S15 described above (step S18).

The wireless base station 1 may randomly select an antenna to be tentatively changed in beam shape and a post-tentative-change beam shape, or may select them in a predetermined order.

When the wireless base station 1 receives the communication quality information fed back in step S18, the wireless base station 1 compares the newly fed back communication quality information with the communication quality information fed back last time in step S15 described above. As a result of the comparison, when the communication quality information received in step S18 indicates better communication quality, it is determined that the beam of the shape tentatively changed in step S16 be continuously used (step S19). In the example illustrated in FIG. 4, the beam shape controller 114 of the wireless base station 1 controls the antenna $15_1$ so as to form a beam of beam shape #3 and controls the antenna $15_2$ so as to form a beam of beam shape #2. When the communication quality information received in step S15 indicates better communication quality than the communication quality information received in step S18, the wireless base station 1 returns the beam shape tentatively changed in step S16 to the shape before the tentative change. That is, the wireless base station 1 determines that the beam of the pre-tentative-change shape be used. In the example in FIG. 4, the wireless base station 1 returns the shape of the beam formed by the antenna $15_1$ to beam shape #2. Steps S14 to S19 show processing of redetermining beam shapes.

Then, using the post-change beams, the wireless base station 1 transmits data and a DMRS from the antennas 15 (antennas $15_1$ and $15_2$) (step S20). Hereinafter, the wireless base station 1 and the wireless terminal 2A repeatedly execute an operation to execute the same processing as that in steps S15 to S16 described above to tentatively change a beam shape, and further to execute the same processing as that in steps S17 to S19 to change the shape of a beam, that is, processing to redetermine beam shapes, to control the antennas 15 such that the shapes of beams formed by the antennas 15 become optimum. This enables communication using beams of optimum shapes to maintain high communication quality even when the states of channels between the wireless base station 1 and the wireless terminals 2 change, for example.

The wireless base station 1 repeatedly executes, with each wireless terminal 2 (wireless terminals 2A, 2B, . . . ), processing to tentatively change the shape of a beam, and collect communication quality information when a post-tentative-change beam is used, to change the beam shape to the post-tentative-change beam shape or return the beam shape to the pre-tentative-change beam shape, specifically, processing corresponding to steps S14 to S19 described above.

Although the number of array antennas assigned to one wireless terminal 2 is two in the example illustrated in FIG. 4, the number is not necessarily limited to two, and may be one or three or more.

As for the beam shape search procedure (redetermination procedure) in steps S16 to S19, for example, when a certain extent of performance improvement or more has been made, or a fixed number of searches have been made, the search processing in steps S16 to S19 may be stopped. "When a certain extent of performance improvement or more has been made" corresponds to a case where, when received power is used as communication quality, for example, the difference between received power after a beam is changed by the beam shape search procedure and received power before the beam shape search procedure is started reaches a threshold.

Figure 8:
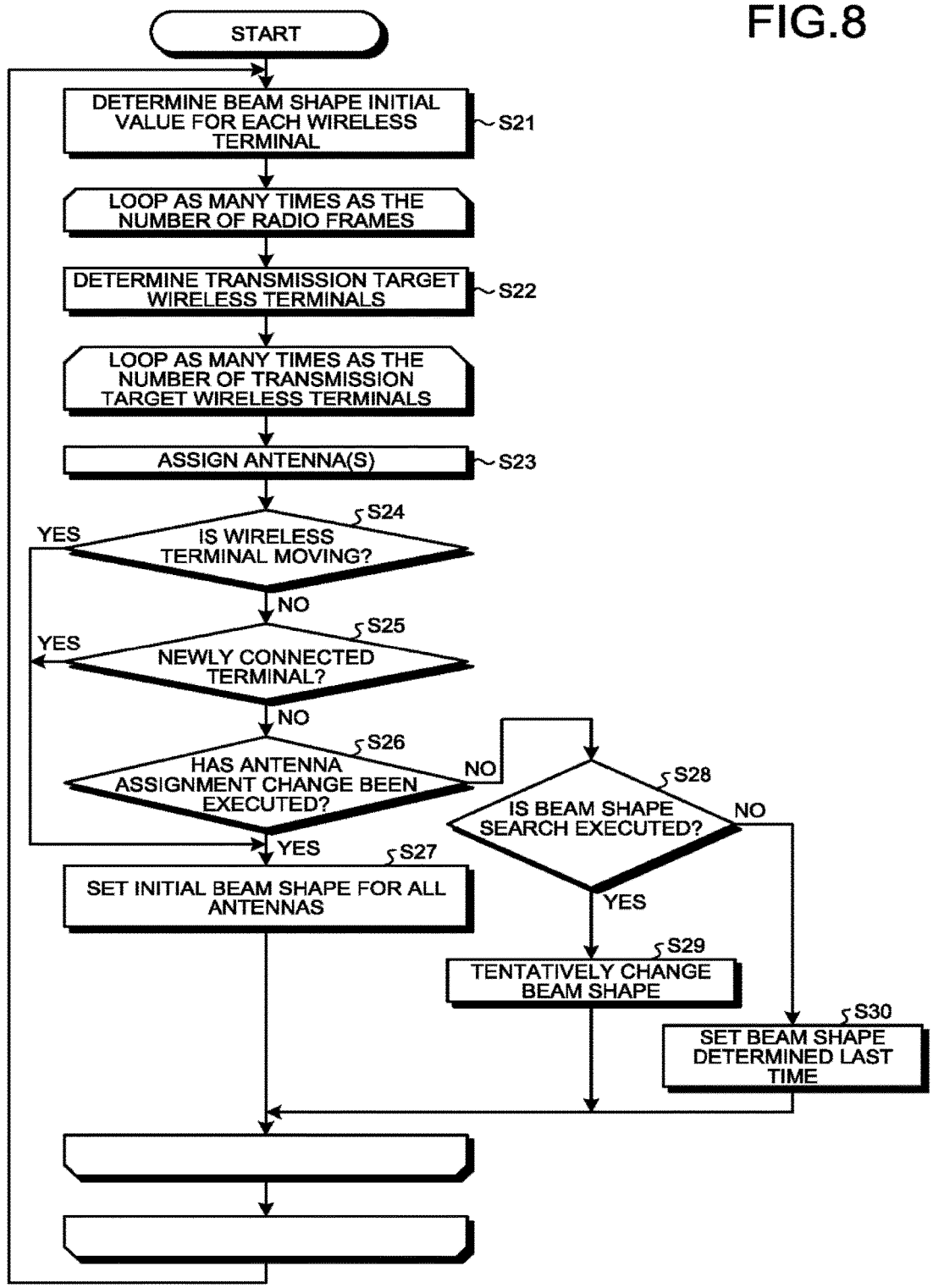
FIG. 8 is a flowchart illustrating an example of an operation by a beam shape controller in the first embodiment to determine a beam shape to be formed by each antenna.

Next, the operation of the beam shape controller 114 of the wireless base station 1 will be described in detail. FIG. 8 is a flowchart illustrating an example of an operation by the beam shape controller 114 to determine the shape of a beam to be formed by each antenna 15.

First, the beam shape controller 114 determines a beam shape initial value for each of the wireless terminals 2 connected to the wireless base station 1 (step S21). In this step S21, the beam shape controller 114 performs processing, following the procedure in steps S11 to S13 in FIG. 4 already described to determine a beam shape initial value to communicate with each wireless terminal 2.

Next, the beam shape controller 114 repeatedly performs steps S22 to S30. These steps are repeated a specified number of times. Specifically, these are repeated a number of times corresponding to a predetermined number of radio frames. For example, when steps S22 to S30 are set to be repeated over one hundred radio frames, they are repeated one hundred times.

In the repeated processing for the predetermined number of radio frames, the beam shape controller 114 first determines transmission target wireless terminals in a certain radio frame (step S22). That is, the beam shape controller 114 determines wireless terminals 2 to which data are transmitted. Transmission target wireless terminals 2 may be determined in any manner. For example, the beam shape controller 114 sets wireless terminals 2 to which data stored in a transmission buffer (not illustrated) in the MIMO processing unit 112 are addressed, for transmission targets. When data of different priorities are stored in the transmission buffer, the beam shape controller 114 may determine transmission target wireless terminals 2, considering the priorities of the data. Alternatively, the beam shape controller 114 may determine transmission target wireless terminals, using beam shapes directed to the wireless terminals 2 determined in step S21 described above as a basis for decision. For example, transmission target wireless terminals are selected so that the shapes of beams to be used in signal transmission to transmission target wireless terminals are different to each other as much as possible.

When the beam shape controller 114 determines transmission target wireless terminals 2, the beam shape controller 114 repeatedly executes steps S23 to S30 for each of the transmission target wireless terminals 2. For example, when the number of the transmission target wireless terminals 2 is ten, the steps are repeated ten times. In the repeated processing, the beam shape controller 114 first assigns an antenna 15 to be used in signal transmission to one selected from among the transmission target wireless terminals 2 (step S23). That is, the beam shape controller 114 determines an antenna to be used in signal transmission to a wireless terminal 2 selected from among the transmission targets (hereinafter, referred to as a selected terminal). The beam shape controller 114 assigns an antenna 15, based on the ability of a selected terminal, communication quality to be satisfied, and the like. The ability of a selected terminal is, for example, the number of antennas that the selected terminal has, that is, the number of spatial multiplexing supported by the selected terminal. The communication quality to be satisfied is the Quality of Service (QoS), the contracted band, and the like of a selected terminal. In step S23, one or more antennas are assigned to the wireless terminal 2. Next, the beam shape controller 114 determines whether the selected terminal is moving or not (step S24). For example, the beam shape controller 114 determines whether the selected terminal is moving or not, based on the amount of change per specified time in the reception quality of a signal transmitted from the selected terminal, the amount of change per specified time in communication quality indicated from the selected terminal, or the like. It is a conceivable case that although the selected terminal is not moving, the amount of change in reception quality, communication quality, or the like is increased by a change in the surrounding environment of radio wave propagation. In this case, it is determined that the selected terminal is "moving." When the beam shape controller 114 determines that the selected terminal is moving (step S24: Yes), the beam shape controller 114 sets the shapes of beams formed by all antennas 15 assigned to the selected terminal in step S23 to an initial beam shape (step S27). The initial beam shape is a beam shape corresponding to the initial value determined in step S21. In this case, initial beam shapes at the antennas 15 assigned to the selected terminal are the same. On the other hand, when the beam shape controller 114 determines that the selected terminal is not moving (step S24: No), the beam shape controller 114 determines whether the selected terminal corresponds to a newly connected terminal or not, that is, whether the selected terminal is a wireless terminal newly connected to the wireless base station 1 or not (step S25). Whether the selected terminal is a wireless terminal newly connected to the wireless base station 1 or not may be determined in any manner. As an example, when there have been no records of data transmission to the selected terminal for a certain past period, or when no notifications of communication quality information have been received from the selected terminal for a certain past period, the beam shape controller 114 determines that the selected terminal is a wireless terminal newly connected to the wireless base station 1. When the selected terminal is a newly connected terminal (step S25: Yes), the beam shape controller 114 executes step S27. On the other hand, when the selected terminal is not a newly connected terminal (step S25: No), the beam shape controller 114 determines whether the antenna assignment to the selected terminal has been changed or not, that is, the antenna 15 assigned in step S23 described above has been changed from an antenna 15 assigned in step S23 last time (step S26). When the antenna assignment to the selected terminal has been changed (step S26: Yes), the beam shape controller 114 executes step S27.

When the antenna assignment to the selected terminal has not been changed (step S26: No), the beam shape controller 114 determines whether or not to execute a beam shape search (step S28). For example, when the beam shape controller 114 determines that communication quality indicated by communication quality information obtained from the selected terminal is less than a threshold, that is, desired communication quality has not been achieved, the beam shape controller 114 determines that a beam shape search, that is, processing to redetermine a beam shape be executed. Alternatively, when elapsed time since the last communication quality information has been obtained from the selected terminal exceeds a threshold, that is, no communication quality information has been obtained from the selected terminal for a long period of time, the beam shape controller 114 determines that a beam shape search be executed. The way of determining whether to execute a beam shape search or not is not limited to these. Any manner of determination may be used.

When the beam shape controller 114 determines that a beam shape search be executed (step S28: Yes), the beam shape controller 114 tentatively changes a beam shape (step S29). When the beam shape controller 114 tentatively changes a beam shape, the beam shape controller 114 stores a wireless terminal for which a beam shape has been tentatively changed. Then, data is transmitted to the wireless terminal, and the beam shape controller 114 waits for communication quality information to be fed back. When communication quality information is fed back from the wireless terminal for which the beam shape has been tentatively changed, the beam shape controller 114 determines whether to continuously use the post-tentative-change beam shape thereafter, or to return the beam shape to the original pre-tentative-change beam shape. That is, when the beam shape controller 114 determines that a beam shape search be executed in step S28, the beam shape controller 114 executes processing illustrated in steps S16 to S19 in FIG. 4 to redetermine beam shapes. When the beam shape controller 114 determines that no beam shape search be executed (step S28: No), the beam shape controller 114 determines that beams of the same shape as that of the last beam be used (step S30).

After the beam shape controller 114 executes steps S23 to S30 for all the transmission target terminals, and further executes steps S22 to S30 for the predetermined number of radio frames, the beam shape controller 114 returns to step S21 to repeat the processing in steps S21 to S30.

FIG. 8 illustrates the operation of the beam shape controller 114, and thus does not describe processing of the wireless base station 1 to transmit data to the wireless terminals 2. The wireless base station 1 transmits data every time steps S22 to S30 are executed for each radio frame.

The beam shape controller 114 executes steps S22 to S30 illustrated in FIG. 8 for a plurality of radio frames and wireless terminals, thereby determining whether the initial beam shape determined in step S21 needs to be changed or not. When the initial beam shape needs to be changed, the beam shape controller 114 executes step S29. As a result, a beam shape is changed to an optimal beam shape. Further, the beam shape controller 114 determines whether further change is necessary or not on a post-change beam shape. When a further change is necessary, the post-change beam shape is changed again to an optimal beam shape.

The repetition of steps S22 to S30 may be terminated before they are repeated the number of times corresponding to the predetermined number of radio frames. For example, when communication quality after tentative change of a beam shape becomes lower than communication quality before the tentative change, or both are on the same level, that is, no improvement in communication quality is expected by change of a beam shape, the repetition of steps S22 to S30 may be terminated. In this case, radio resources can be prevented from being consumed more than necessary by unnecessary repetition of beam shape adjustment.

As above, the wireless base station 1 in the present embodiment forms beams all over an area that should be covered to transmit a signal for communication quality measurement, and determines an initial value of the shape of beam used in data transmission to each wireless terminal, that is an initial beam shape, based on communication quality of each beam measured by each wireless terminal that has received the signal for communication quality measurement. At this time, initial values of the beam shapes of array antennas used in data transmission to one wireless terminal are set to be same. Thereafter, the wireless base station 1 tentatively changes a beam shape in use to a different beam shape for each wireless terminal, and determines which of the beam of the pre-tentative-change beam shape and the beam of the post-tentative-change beam shape be continuously used, based on communication quality in the post-tentative-change beam shape and communication quality in the pre-tentative-change beam shape. Specifically, when the communication quality in the post-tentative-change beam shape is better than the communication quality in the pre-tentative-change beam shape, the post-tentative-change beam shape is set for a beam shape to be newly used, and is continuously used. When a beam shape is tentatively changed, it is changed to a beam shape similar to the beam shape in use. Thus, once a beam shape is determined, a new beam shape can be determined based on communication quality when beams of some beam shapes are used instead of communication quality when each of all formable beam shapes is used, and the amount of consumption of radio resources when a beam shape is determined can be reduced. Further, reception wait time for a wireless terminal to detect all patterns of a common reference signal from all array antennas is shortened, so that connection time for a wireless communication terminal to be connected to a wireless base station can be shortened.

Here, hardware configurations of the baseband processing units 11 and 16 and the array antennas 15 of the wireless base station 1, and the baseband processing unit 25 of the wireless terminal 2 will be described.

Figure 9:
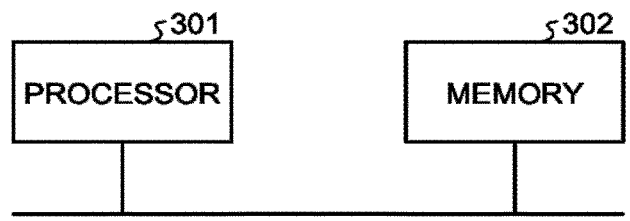
FIG. 9 is a diagram illustrating an example of a hardware configuration that implements a baseband processing unit and array antennas in the wireless base station and a baseband processing unit in the wireless terminal.

The MIMO processing unit 112 of the baseband processing unit 11 that the wireless base station 1 has is an electronic circuit that performs precoding on the streams 111 fed. The OFDM processing units 113 are each an electronic circuit that performs modulation processing, IFFT processing, CP addition processing, and others on signals fed from the MIMO processing unit 112. The beam shape controller 114 is implemented by a processor 301 illustrated in FIG. 9 executing a program stored in memory 302. Specifically, the beam shape controller 114 is implemented such that the processor 301 reads a program for performing the operation of the beam shape controller 114 from the memory 302 and executes the program. The processor 301 is a CPU (also called a central processing unit, a central processor, a processing unit, an arithmetic unit, a microprocessor, a microcomputer, a processor, and a digital signal processor (DSP)), a system large-scale integration (LSI), or the like. The memory 302 is nonvolatile or volatile semiconductor memory such as random-access memory (RAM), read-only memory (ROM), flash memory, an erasable programmable read-only memory (EPROM), or an electrically erasable programmable read-only memory (EEPROM), or a magnetic disk, a flexible disk, an optical disk, a compact disk, a mini disk, a digital versatile disk (DVD), or the like. The memory 302 is used as a storage area for communication quality information fed back from the wireless terminals 2, information on beam shapes used in communication with the wireless terminals 2, and others.

The array antennas 15 that the wireless base station 1 has are each formed of a plurality of phase shifters and antenna elements.

The MIMO processing unit 162 of the baseband processing unit 16 that the wireless base station 1 has is an electronic circuit that weights and combines received signals fed from each of the OFDM processing units 163. The OFDM processing units 163 are each an electronic circuit that performs CP removal processing, FFT processing, demodulation processing, and others on signals fed from the ADCs 17. The feedback information extractor 161 is implemented by the processor 301 illustrated in FIG. 9 executing a program stored in the memory 302. Specifically, the feedback information extractor 161 is implemented by the processor 301 reading a program for performing the operation of the feedback information extractor 161 from the memory 302 and executing the program.

The OFDM processing unit 251 of the baseband processing unit 25 that the wireless terminal 2 has is an electronic circuit that performs CP removal processing, FFT processing, demodulation processing, and others on received signals fed from the ADC 24. The OFDM processing unit 254 is an electronic circuit that performs modulation processing, IFFT processing, CP addition processing, and others on signals fed from the feedback information transmitter 253. The CRS processing unit 252 and the feedback information transmitter 253 are implemented by a processor 301 illustrated in FIG. 9 executing a program stored in memory 302. Specifically, the CRS processing unit 252 and the feedback information transmitter 253 are implemented by the processor 301 reading a program for performing the operations of the CRS processing unit 252 and the feedback information transmitter 253 from the memory 302 and executing the program.

Second Embodiment

A wireless communication apparatus according to a second embodiment will be described. The configuration of a communication system to which the wireless communication apparatus is applied and the configuration of the wireless communication apparatus are both identical to those in the first embodiment.

Figure 10:
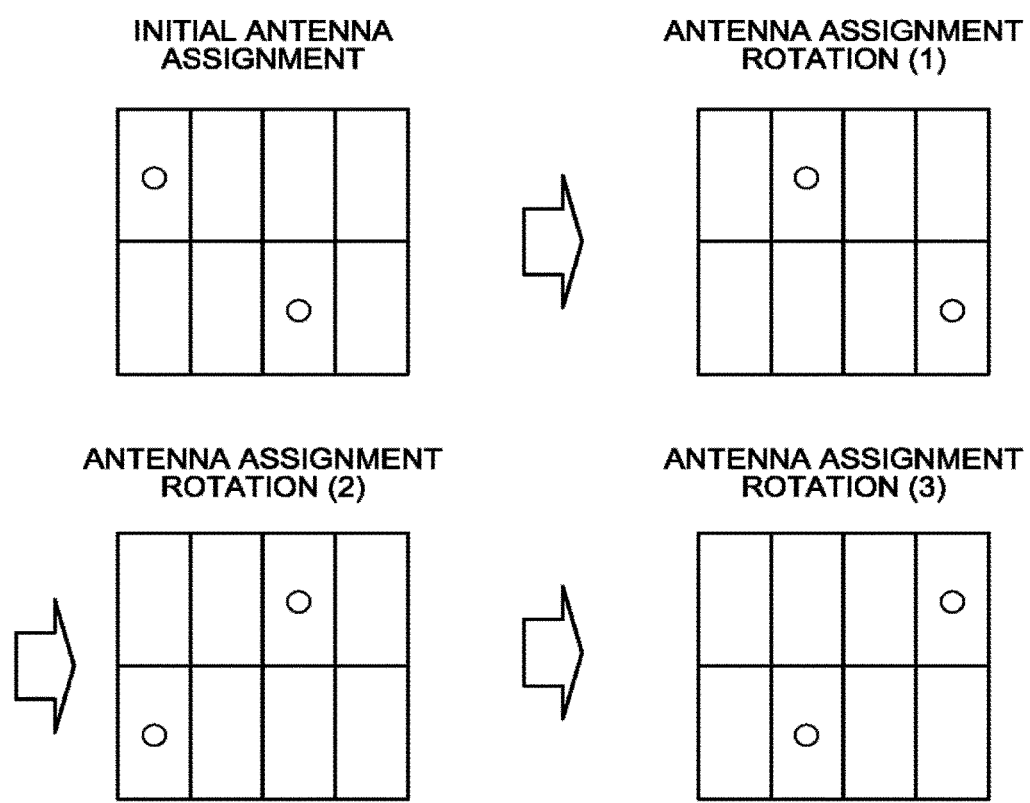
FIG. 10 is a diagram illustrating an operation example of a wireless base station according to a second embodiment.

The wireless base station 1 as the wireless communication apparatus according to the first embodiment tentatively changes a beam shape in step S16 illustrated in FIG. 4. In addition to change of a beam shape, antennas used in transmission of data and a DMRS may be tentatively changed. For example, a wireless base station 1 according to the present embodiment changes antennas in rotation illustrated in FIG. 10 each time the wireless base station 1 executes processing corresponding to step S16 illustrated in FIG. 4. FIG. 10 is a diagram illustrating an example of change of antenna positions when the number of antennas 15 is eight, and two in eight are assigned to a wireless terminal 2 to perform communication. In FIG. 10, eight rectangles aligned in two rows and four columns indicate the positions of the eight antennas. Instead of simultaneously performing tentative change of antennas and tentative change of a beam shape, in step S16 executed repeatedly, tentative change of antennas may be performed at a certain time, and tentative change of a beam shape may be performed at another time. In the example in FIG. 10, two antennas 15 are assigned to a wireless terminal 2 in four assignment change patterns. There is no need to be particularly limited to that, and three or more antennas 15 may be assigned to one wireless terminal 2. As for assignment change patterns, there is no need to comply with those in FIG. 10. Change may be made in various change patterns. When communication quality after tentative change of antenna assignment and a beam shape is better than communication quality before the tentative change, the wireless base station 1 changes setting to continuously use post-tentative-change antennas and beam shapes. When pre-tentative-change communication quality is better than post-tentative-change communication quality, the wireless base station 1 uses the same antennas and beam shapes as those up to that time, that is, pre-tentative-change antennas and beam shapes.

Thus, the wireless base station in the present embodiment tentatively changes antennas 15 used also when a beam shape is tentatively changed. This, in addition to the effects in the first embodiment, further allows antennas 15 used in transmission to a wireless terminal 2 to be changed to antennas 15 that reduce correlation between a plurality of streams transmitted in MIMO, and enables further improvement in MIMO transmission performance.

Third Embodiment

A wireless communication apparatus according to a third embodiment will be described. The configuration of a communication system to which the wireless communication apparatus is applied, and the configuration of the wireless communication apparatus are both identical to those in the first embodiment.

When the wireless base station 1 as the wireless communication apparatus according to the first embodiment determines a beam shape initial value as illustrated in FIG. 4, the wireless base station 1 receives from a wireless terminal 2 a notification of a beam ID indicating a beam shape that provides the best communication quality. On the other hand, a wireless base station 1 according to the present embodiment collects, from each wireless terminal 2, not only a beam shape that provides the best communication quality but also the beam IDs of all beam shapes or the beam IDs of a plurality of beam shapes of higher ranks in communication quality together with communication quality information when beams of the beam shapes are used. That is, when each of the wireless terminals 2 according to the third embodiment receives a CRS transmitted from each antenna 15 of the wireless base station 1 in step S11, in processing corresponding to step S12 illustrated in FIG. 4, each of the wireless terminals 2 measures communication quality of each beam, and notifies the wireless base station 1 of the beam IDs of all beams and communication quality information, or the beam IDs of a plurality of beams of higher ranks in communication quality and communication quality information, together with the number of a radio frame in which the beams have been received.

Figure 11:
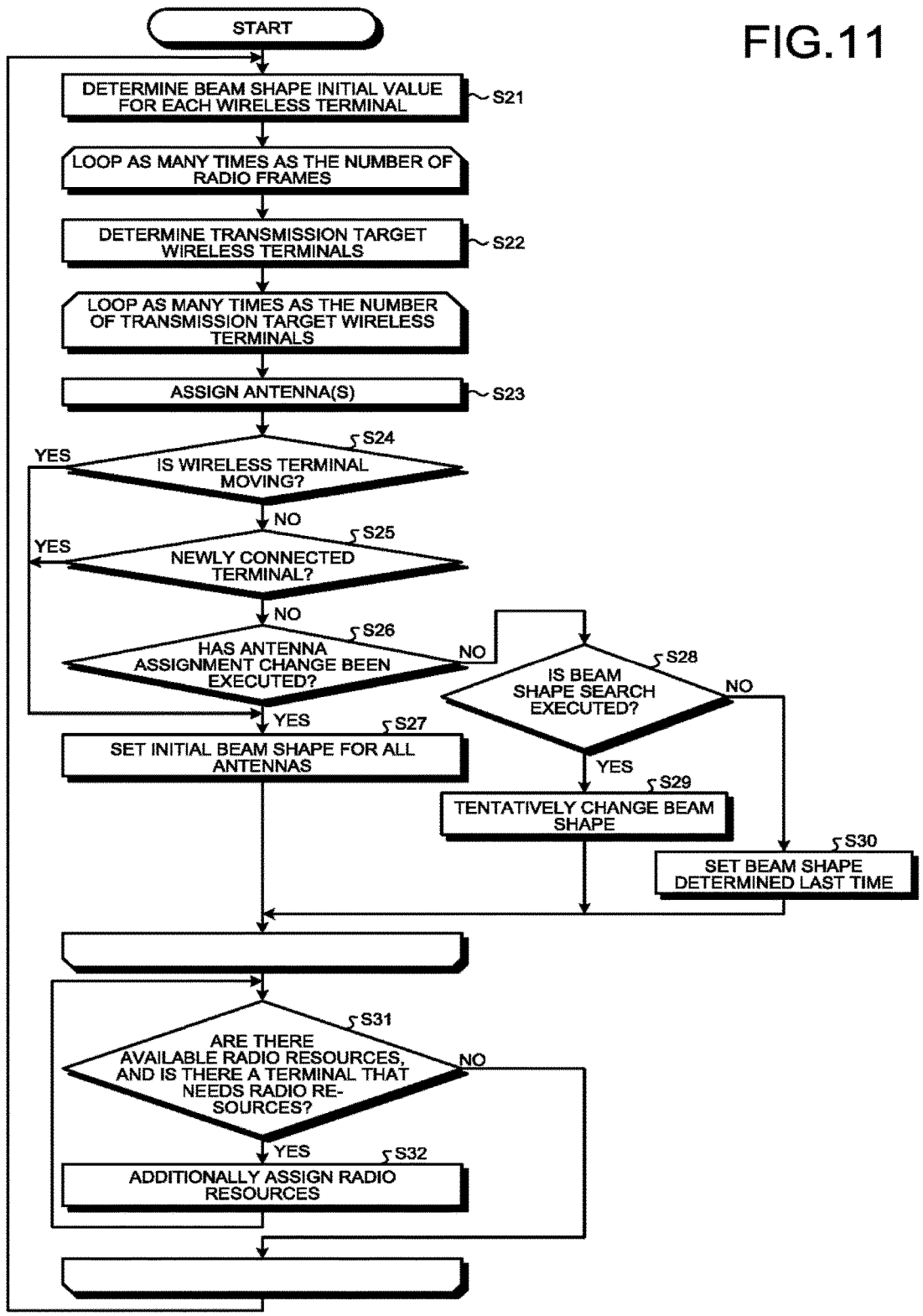
FIG. 11 is a flowchart illustrating an example of an operation by a beam shape controller in a third embodiment to determine the shape of a beam to be formed by each antenna.

FIG. 11 is a flowchart illustrating an example of an operation by a beam shape controller 114 in the wireless base station 1 according to the third embodiment to determine the shape of a beam formed by each antenna 15. FIG. 11 is the flowchart illustrated in FIG. 8 to which steps S31 and S32 are added. An operation in steps S21 to S30 illustrated in FIG. 11 is identical to that in the first embodiment, and thus will not be described.

When the wireless base station 1 and the wireless terminals 2 constitute an orthogonal frequency-division multiple access (OFDMA) system, for example, there is a possibility that after the wireless base station 1 executes processing in steps S23 to S30 on each transmission target wireless terminal determined in step S22 and assigns radio resources, radio resources not assigned to any wireless terminals 2 remain. Assuming that a case like this happens, the beam shape controller 114 of the wireless base station 1 according to the present embodiment executes steps S31 and S32. Radio resources not assigned to any wireless terminals 2 are antennas 15 that have not been assigned to any transmission target wireless terminals in step S23 that has been executed on each of the transmission target wireless terminals determined in step S22.

In step S31, the beam shape controller 114 checks whether there are available radio resources and there is a wireless terminal that needs radio resources. That is, the beam shape controller 114 checks whether or not there are radio resources left unassigned to transmission target wireless terminals determined in step S22, and data addressed to a wireless terminal 2 that has not been set as a transmission target wireless terminal in step S22 is queued in a transmission buffer in a MIMO processing unit 112.

When there are no available radio resources, or there are no wireless terminals that need radio resources although there are available radio resources (step S31: No), the beam shape controller 114 returns to step S21 and repeats processing in steps S21 to S32.

On the other hand, when there are available radio resources and there is a wireless terminal that needs radio resources (step S31: Yes), the beam shape controller 114 assigns radio resources to one wireless terminal that needs radio resources (step S32). When there is a plurality of wireless terminals that needs radio resources, the beam shape controller 114 determines a wireless terminal to be assigned with radio resources, based on communication quality information indicated from each wireless terminal that needs radio resources. "Communication quality information indicated from a wireless terminal" used at this time is communication quality information on each of a plurality of beam shapes indicated from each wireless terminal that needs radio resources when a beam shape initial value is determined in step S21. After executing step S32, the beam shape controller 114 returns to step S31, and hereinafter, repeatedly executes steps S31 and S32 until there are no available radio resources, or there are no wireless terminals that need radio resources although there are available radio resources.

When the beam shape controller 114 determines in step S31 that there are no available radio resources, or when the beam shape controller 114 determines that there are no wireless terminals that need radio resources although there are available radio resources, the wireless base station 1 in the present embodiment transmits data to the wireless terminals assigned with radio resources.

Thus, the wireless base station 1 in the present embodiment checks whether there are available radio resources or not after the completion of radio resource assignment to once-determined transmission target wireless terminals. When there are available radio resources, the wireless base station 1 assigns remaining radio resources to a wireless terminal that needs radio resources. This allows radio resources to be assigned without being wasted, and allows system communication capacity to be increased.

Fourth Embodiment

A wireless communication apparatus according to a fourth embodiment will be described. The configuration of a communication system to which the wireless communication apparatus is applied, and the configuration of the wireless communication apparatus are identical to those in the first embodiment.

Figures 12, 13:
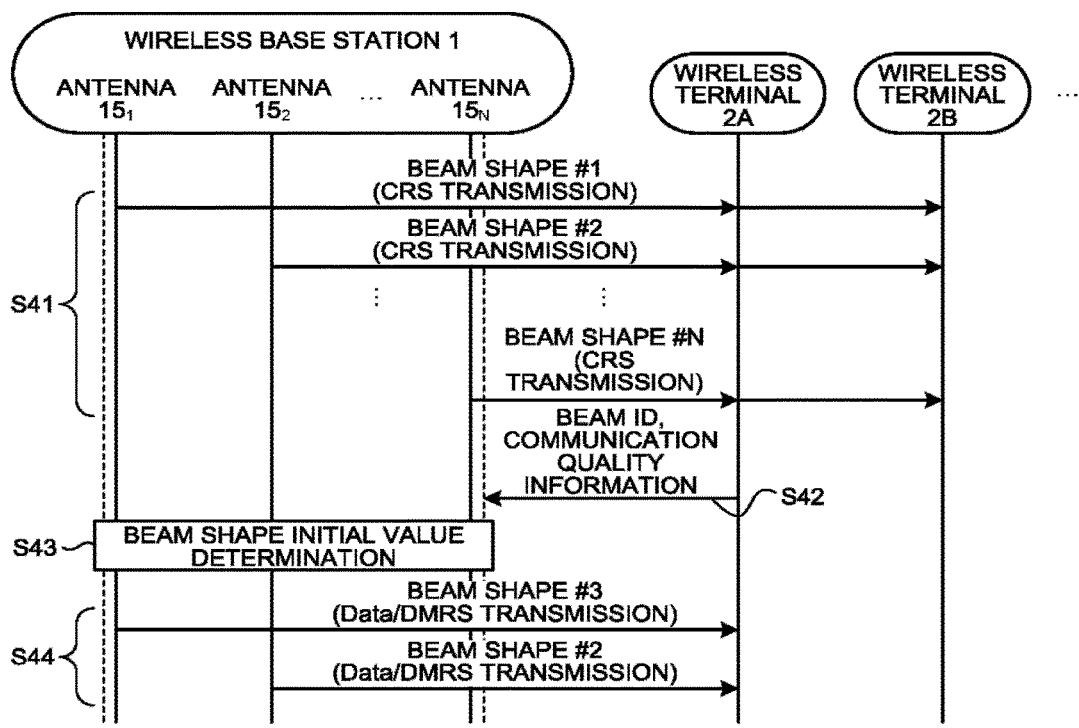
FIG. 12 is a sequence diagram illustrating an example of a beam shape control operation by a wireless base station in a fourth embodiment.
FIG. 13 is a diagram illustrating an example of communication quality information.

A wireless base station 1 according to the present embodiment determines the shapes of beams to be used in data transmission to wireless terminals 2, following a sequence illustrated in FIG. 12. FIG. 12 is a sequence diagram illustrating an example of a beam shape control operation by the wireless base station 1 in the fourth embodiment.

As illustrated in FIG. 12, like the wireless base station 1 according to the first embodiment, the wireless base station 1 according to the fourth embodiment transmits a CRS from all antennas 15, i.e. antennas $15_1$ to $15_N$, to all wireless terminals 2 (wireless terminals 2A, 2B, . . . ) (step S41). In this step S41, the antennas 15 of the wireless base station 1 form beams of different shapes.

The wireless terminals 2 that have received the CRS transmitted from the antennas 15 of the wireless base station 1 in step S41 each measure communication quality of each transmitted beam, and, like the wireless base station 1 according to the third embodiment, notifies the wireless base station 1 of the beam IDs of all beam shapes and communication quality information, or the beam IDs of a plurality of beams of higher ranks in communication quality and communication quality information, together with the number of a radio frame in which the beams have been received (step S42).

In step S42, each wireless terminal 2 notifies the wireless base station 1 of communication quality information of a configuration illustrated in FIG. 13, for example. FIG. 13 illustrates an example of communication quality information when the wireless terminals 2 receive eight beams of beam shapes #1 to #8 in step S41 in FIG. 12. The example illustrated in FIG. 13 is an example of a case where received power is used as communication quality, and the wireless terminals 2 notify received power in each beam shape and information indicating the associated beam shapes as communication quality information.

Returning to the description of FIG. 12, the wireless base station 1 that has received notifications of communication quality information from the wireless terminals assigns antennas 15 to wireless terminals 2 to which data is transmitted, and then determines an initial value of the beam shape of a beam formed by each of the antennas 15 assigned to the wireless terminals 2, based on communication quality information on transmitted beams indicated from the wireless terminals 2 (step S43). Then, using beams of the determined shapes, the wireless base station 1 transmits data and a DMRS to the wireless terminals 2 (step S44). At this time, a beam shape controller 114 assigns each of the antennas 15 assigned to each wireless terminal 2 a beam shape in descending order of rank in communication quality to assign different beam shapes to the antennas. For example, in step S43, first, the beam shape controller 114 assigns a beam shape that provides the best communication quality to the antenna $15_1$, and assigns a beam shape that provides the second best communication quality to the antenna $15_2$. Hereinafter, in the same manner, a beam shape that provides the Nth best communication quality is assigned to the antenna $15_N$. To simplify explanation, a beam shape of the Kth (K=1, 2, . . . , N) best communication quality is assigned to an antenna $15_K$; however, this is an example. Assignment may be made in a different way. For example, a beam shape that provides the best communication quality can be assigned to an antenna 15 that is assigned to a wireless terminal 2 to which a large amount of data is addressed, among data addressed to wireless terminals stored in a transmission buffer in the wireless base station 1. FIG. 12 illustrates an example in which the wireless base station 1 assigns the antennas $15_1$ and $15_2$ to a wireless terminal 2A, forms a beam of beam shape #3 of the best communication quality by the antenna $15_1$, and forms a beam of beam shape #2 of the second best communication quality by the antenna $15_2$, to transmit data and a DMRS.

Thus, receiving notifications of communication quality information on beam shapes from the wireless terminals 2, the wireless base station 1 in the present embodiment determines an initial value of the shape of a beam formed by each antenna 15, based on the communication quality information. Specifically, the wireless base station 1 determines a beam shape initial value of a beam formed by each antenna 15 so that the antennas 15 form beams of different shapes. This enables determination of beam shapes of antennas so as to reduce correlation between MIMO streams to increase system communication capacity.

Although the beam shape controller 114 performs radio resource assignment, i.e. the processing in steps S22 to S23 in FIG. 8 and the processing in steps S22 to S23 and S31 to S32 in FIG. 11 in the embodiments, radio resource assignment may be performed outside the beam shape controller 114. For example, a radio resource assignment unit to assign radio resources to the wireless terminals 2 may be additionally provided independently of the beam shape controller 114.

The configurations illustrated in the above embodiments illustrate an example of the subject matter of the present invention, and can be combined with another known art, and can be partly omitted or changed without departing from the scope of the present invention.

REFERENCE SIGNS LIST 1 wireless base station, 2 wireless terminal, 3 higher-level apparatus, 4 network, 5 beam, 11, 16, 25 baseband processing unit, 12, 26 DAC (Digital to Analog Converter), 13, 22 local oscillator, 14, 18, 23, 27 mixer, 15 array antenna, 17, 24 ADC (Analog to Digital Converter) 21 antenna, 112, 162 MIMO processing unit, 113, 163, 251, 254 OFDM processing unit, 114 beam shape controller, 161 feedback information extractor, 252 CRS processing unit, 253 feedback information transmitter.

The invention claimed is:
1. A wireless communication apparatus that spatially multiplexes data for transmission, comprising:
a plurality of array antennas,
a first processor, and
a first memory to store the first program which, when executed by the first processor, performs processes of,
controlling the plurality of array antennas so that the array antennas form beams of different shapes and each transmit signals for communication quality measurement in an area to be covered by the apparatus,
determining an initial value of a beam shape to be used in data transmission to a counterpart device that has received the signals for communication quality measurement, based on communication quality of each beam measured by the opposite apparatus, and
after the initial value is determined, repeatedly executing processing to control the array antennas to tentatively change a beam shape in use in data transmission to the counterpart device, and to redetermine a beam shape to be used in data transmission to the counterpart device, based on communication quality measured when a post-tentative-change beam shape is used and communication quality measured when a pre-tentative-change beam shape is used, wherein the first processor sets a beam shape to be used in data transmission to the counterpart device to a beam shape indicated by the initial value when an array antenna used in data transmission to the counterpart device is changed.

2. A wireless communication apparatus that spatially multiplexes data for transmission, comprising:
- a plurality of array antennas,
- a first processor, and
- a first memory to store the first program which, when executed by the first processor, performs processes of,
- controlling the plurality of array antennas so that the array antennas form beams of different shapes and each transmit signals for communication quality measurement in an area to be covered by the apparatus,
- determining an initial value of a beam shape to be used in data transmission to a counterpart device that has received the signals for communication quality measurement, based on communication quality of each beam measured by the opposite apparatus, and
- after the initial value is determined, repeatedly executing processing to control the array antennas to tentatively change a beam shape in use in data transmission to the counterpart device, and to redetermine a beam shape to be used in data transmission to the counterpart device, based on communication quality measured when a post-tentative-change beam shape is used and communication quality measured when a pre-tentative-change beam shape is used, wherein
- on each radio frame basis, the first processor determines counterpart devices to which data are transmitted, and executes radio resource assignment processing to select each of the determined counterpart devices to which data is transmitted one by one sequentially, and assign one or more of the array antennas, which is to be used in data transmission to each selected counterpart device, to the selected counterpart device, and
- in the radio resource assignment processing, the first processor redetermines a beam shape to be used in data transmission to the selected counterpart device each time the array antenna is assigned to the selected counterpart device.

3. The wireless communication apparatus according to claim 2, wherein when there is an array antenna that is not assigned to any one of the counterpart devices and there is data addressed to a counterpart device to which no array antennas are assigned in the radio resource assignment processing after the first processor has executed the radio resource assignment processing, the first processor assigns an array antenna, which is not assigned to any one of the counterpart devices, to the counterpart device to which the data is addressed.

* * * * *